(12) United States Patent  (10) Patent No.: US 7,909,050 B2
Zeng  (45) Date of Patent: Mar. 22, 2011

(54) CANOPY ASSEMBLY MECHANISM AND RELATED CHILD CARRIER

(75) Inventor: Hai-Bo Zeng, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 105 days.

(21) Appl. No.: 12/504,626

(22) Filed: Jul. 16, 2009

(65) Prior Publication Data

US 2010/0163088 A1    Jul. 1, 2010

(30) Foreign Application Priority Data

Dec. 26, 2008  (CN) .......................... 2008 1 0190675

(51) Int. Cl.
  *E04H 15/02*  (2006.01)
(52) U.S. Cl. ...................... 135/88.02; 135/133; 280/642
(58) Field of Classification Search ............... 135/88.02, 135/96, 132–133; 280/642, 647, 47.38; 296/111, 296/105, 109; 297/184.16, 184.17; 403/109.1–109.3, 109.8, 300, 308
See application file for complete search history.

(56) References Cited

U.S. PATENT DOCUMENTS

| 5,190,390 | A | * | 3/1993 | Ming-Tai ........................ 403/24 |
| 5,417,450 | A | * | 5/1995 | Wang ........................... 280/642 |
| 5,711,743 | A | * | 1/1998 | Nichols et al. .................. 482/27 |
| 5,845,666 | A | * | 12/1998 | Messner ........................ 135/133 |
| 5,865,447 | A | * | 2/1999 | Huang ........................... 280/30 |
| 6,155,740 | A | * | 12/2000 | Hartenstine .................... 403/102 |
| 6,443,522 | B1 | * | 9/2002 | Kain et al. ................. 297/184.17 |
| 7,090,231 | B1 | * | 8/2006 | Liao ............................ 280/47.38 |
| 7,178,822 | B2 | * | 2/2007 | Chen ............................ 280/642 |
| 7,364,171 | B2 | * | 4/2008 | Hu ............................. 280/47.38 |
| 7,588,263 | B2 | * | 9/2009 | Yang ............................ 280/642 |
| 7,686,323 | B2 | * | 3/2010 | Chen ............................ 280/642 |
| 7,753,397 | B2 | * | 7/2010 | Yang ............................ 280/642 |
| 7,766,366 | B2 | * | 8/2010 | Li ............................... 280/642 |
| 7,798,500 | B2 | * | 9/2010 | Den Boer ................... 280/47.34 |
| 2005/0051998 | A1 | | 3/2005 | Hsia |

FOREIGN PATENT DOCUMENTS

| DE | 200 12 835 U1 | 10/2001 |
| EP | 1642802 | 4/2006 |
| JP | 5456860 | 4/1979 |

* cited by examiner

*Primary Examiner* — Winnie Yip
(74) *Attorney, Agent, or Firm* — Winston Hsu; Scott Margo (57) ABSTRACT

A canopy mechanism comprises a canopy support and a canopy frame. The canopy support comprises a combining part and an engaging part. A terminal of the engaging part connects the combining part, and another terminal of the engaging part extends opposite to the combining part. The engaging part comprises a first lateral wall and a second lateral wall. A chamber is formed between the first and second lateral walls, and one terminal of the chamber has a chamber entrance. The second lateral wall has an opening, and a cantilever structure extends from a side of the opening therein. The cantilever structure has a first position-limiting part. The canopy frame has a connection part with a second position-limiting part. The connection part of the canopy frame inserts into the chamber via the chamber entrance to engage the first and second position-limiting parts to fasten the canopy frame and the canopy support.

19 Claims, 10 Drawing Sheets

CANOPY ASSEMBLY MECHANISM AND RELATED CHILD CARRIER

BACKGROUND OF THE INVENTION

1. Field of the Invention

The present invention relates to a canopy mechanism and a related child carrier, and more particularly, to a canopy mechanism which is easy to disengage and engage and a related child carrier.

2. Description of the Prior Art

Figure 1:
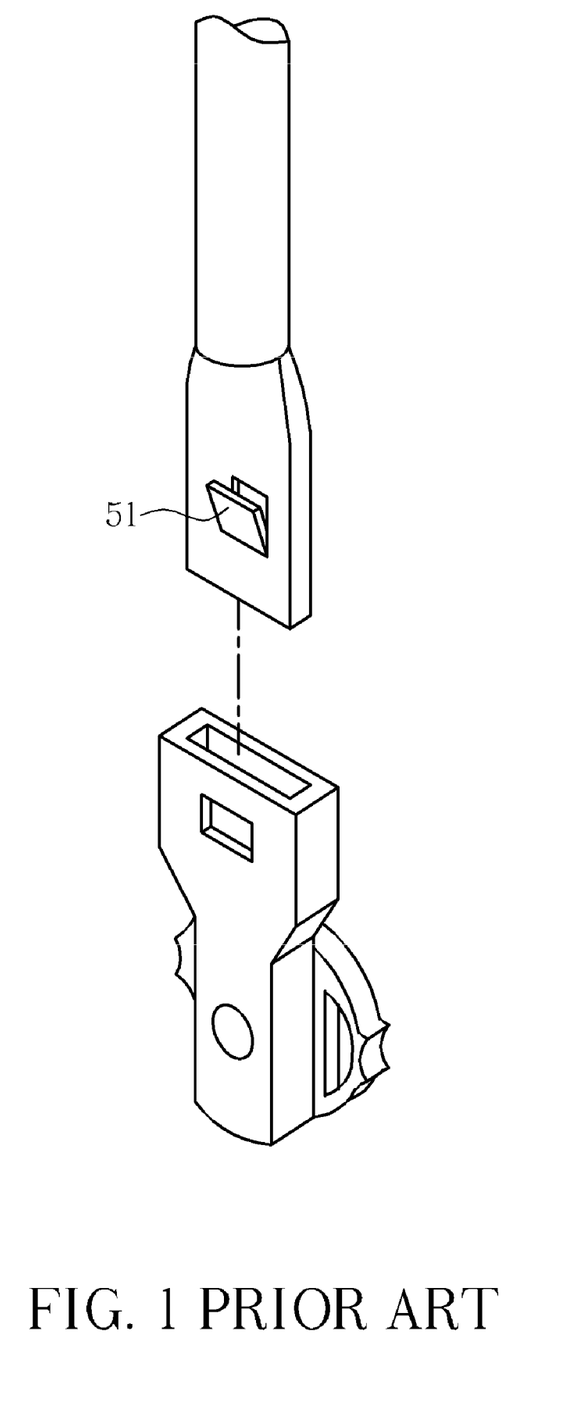
FIG. 1 shows a canopy mechanism disclosed in U.S. Pat. No. 5,190,390.
Figure 2:
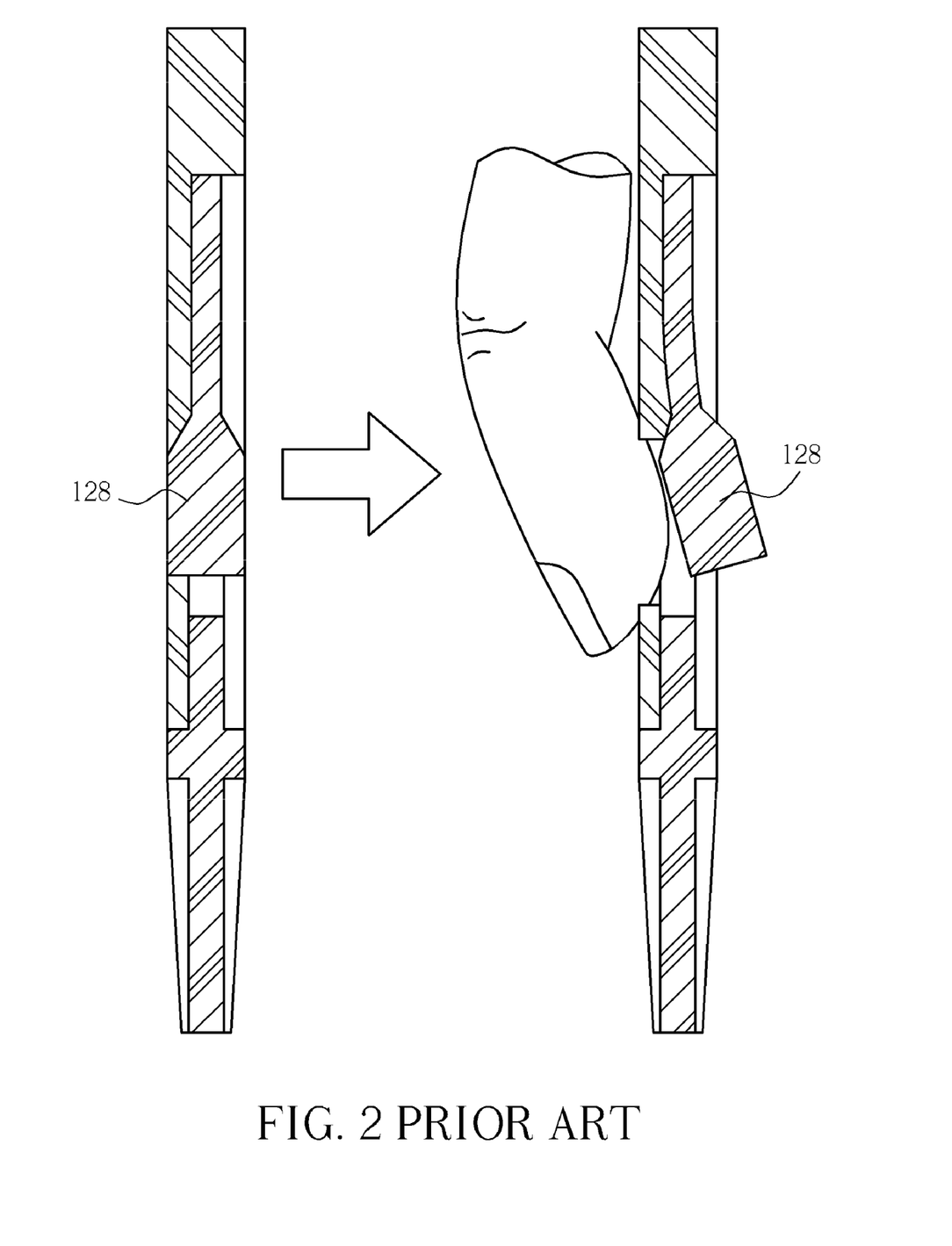
FIG. 2 shows a canopy mechanism disclosed in U.S. Pat. No. 6,443,522.
Figure 3:
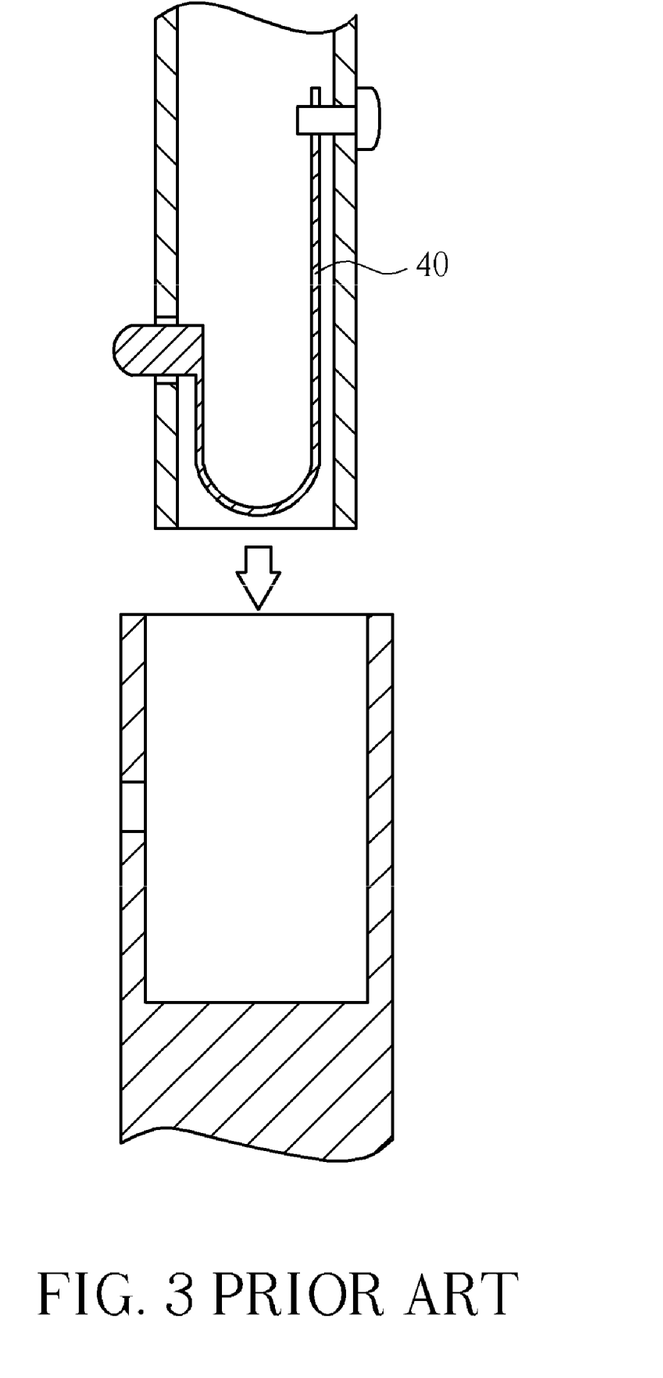
FIG. 3 shows a canopy mechanism disclosed in EP patent No. 1,642,802.

In general, a child carrier (such as a child stroller) usually has a canopy as a sunshade, and a canopy mechanism can let users disengage the canopy for cleaning. Traditional canopy mechanisms are disclosed in U.S. Pat. No. 5,190,390, U.S. Pat. No. 6,443,522, and EP patent No. 1,642,802. Please refer to FIG. 1. FIG. 1 shows a canopy mechanism disclosed in U.S. Pat. No. 5,190,390. As shown in FIG. 1, the canopy mechanism is easy to engage but hard to disengage. The flexible tab 51 is easy to be damaged, and it requires a tool to disengage the canopy mechanism. Please refer to FIG. 2. FIG. 2 shows a canopy mechanism disclosed in U.S. Pat. No. 6,443,522. As shown in FIG. 2, the canopy support and the canopy frame of the canopy mechanism are made by plastic, and mold of the plastic canopy frame is generally bar-shaped. The recess of such mold is thinner and longer and result in problems of difficult to mold, and thus it is easy to have defects. In addition, since the lever arm of the head 128 is short, it is not comfortable for the users when pressing the head 128, and it is difficult to press the head 128. The finger of the user will get stuck in the hole easily. Please refer to FIG. 3. FIG. 3 shows a canopy mechanism disclosed in EP patent No. 1,642,802. As shown in FIG. 3, the canopy frame of the canopy mechanism is an inverted U-shaped member, and a plate spring 40 is required to be assembled, and thus the cost is higher. It is not easy to bend the inverted U-shaped member, and thus it is not easy to assemble.

SUMMARY OF THE INVENTION

It is therefore one of the objectives of the present invention to provide a canopy mechanism which is easy to disengage and engage and a related child carrier, so as to solve the above problem.

According to an embodiment of the present invention, a canopy mechanism is disclosed. The canopy mechanism comprises a canopy support and a canopy frame. The canopy support comprises a combining part and an engaging part. A terminal of the engaging part connects the combining part, and another terminal of the engaging part extends opposite to the combining part. The engaging part comprises: a first lateral wall and a second lateral wall, wherein a chamber is formed between the first and second lateral walls, one terminal of the chamber has a chamber entrance, the first lateral wall has a hole, and the second lateral wall has an opening; and a cantilever structure, extending from a side of the opening therein, wherein the cantilever structure has a first position-limiting part and a protruding part protruding from an inside surface, and the protruding part protrudes from the first lateral wall via the hole of the first lateral wall. The canopy frame has a connection part with a second position-limiting part, wherein the connection part of the canopy frame inserts into the chamber via the chamber entrance to engage the first and second position-limiting parts to fasten the canopy frame and the canopy support.

According to an embodiment of the present invention, a child carrier is disclosed. The child carrier comprises: a frame assembly; a seat, disposed on the frame assembly; a canopy; and a canopy mechanism, wherein the canopy is disposed on the canopy mechanism, the canopy mechanism is disposed on the frame assembly, and the canopy mechanism comprises a canopy support and a canopy frame. The canopy support comprises a combining part and an engaging part. A terminal of the engaging part connects the combining part, and another terminal of the engaging part extends opposite to the combining part. The engaging part comprises: a first lateral wall and a second lateral wall, wherein a chamber is formed between the first and second lateral walls, one terminal of the chamber has a chamber entrance, and the second lateral wall has an opening; and a cantilever structure, extending from a side of the opening therein, wherein the cantilever structure has a first position-limiting part. The canopy frame has a connection part with a second position-limiting part, wherein the connection part of the canopy frame inserts into the chamber via the chamber entrance to engage the first and second position-limiting parts to fasten the canopy frame and the canopy support.

According to an embodiment of the present invention, a canopy mechanism is disclosed. The canopy mechanism comprises a canopy support and a canopy frame. The canopy support comprises a combining part and an engaging part. A terminal of the engaging part connects the combining part, and another terminal of the engaging part extends opposite to the combining part. The engaging part comprises: a first lateral wall and a second lateral wall, wherein a chamber is formed between the first and second lateral walls, one terminal of the chamber has a chamber entrance, and the second lateral wall has an opening; and a cantilever structure, extending from a side of the opening therein, wherein the cantilever structure has a first position-limiting part. The canopy frame has a connection part with a second position-limiting part, wherein the connection part of the canopy frame inserts into the chamber via the chamber entrance to engage the first and second position-limiting parts to fasten the canopy frame and the canopy support.

Briefly summarized, the canopy mechanism disclosed by the present invention has following advantages:

1. A lever arm length of the first position-limiting part engaged with the second position-limiting part is short, and this can ensure the engaging strength.
2. The operation part of the cantilever structure has a longer lever arm so that the users can press easily.
3. The operation part of the cantilever structure is protruding from the first lateral wall so that the users can easily separate the first position-limiting part and the second position-limiting part by pressing the operation part.
4. The canopy frame can be a flexible iron wire, and thus the canopy frame is easy to assemble.
5. The canopy support can be made by plastic, and thus cost of the canopy support is low.
6. The canopy mechanism has few elements and the plastic elements are small so that the cost can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
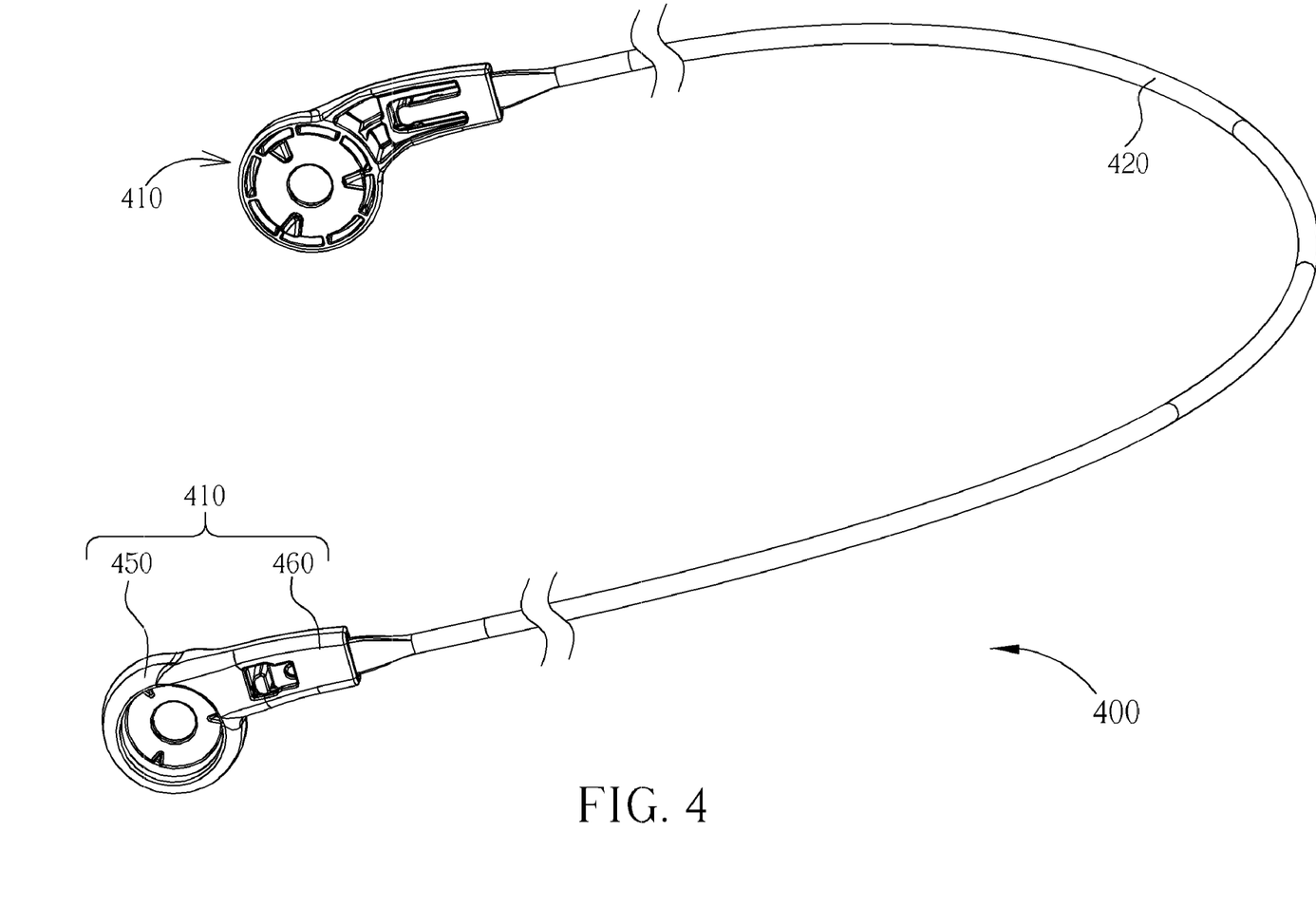
FIG. 4 shows a three-dimensional diagram of a canopy mechanism according to an embodiment of the present invention.
Figure 5:
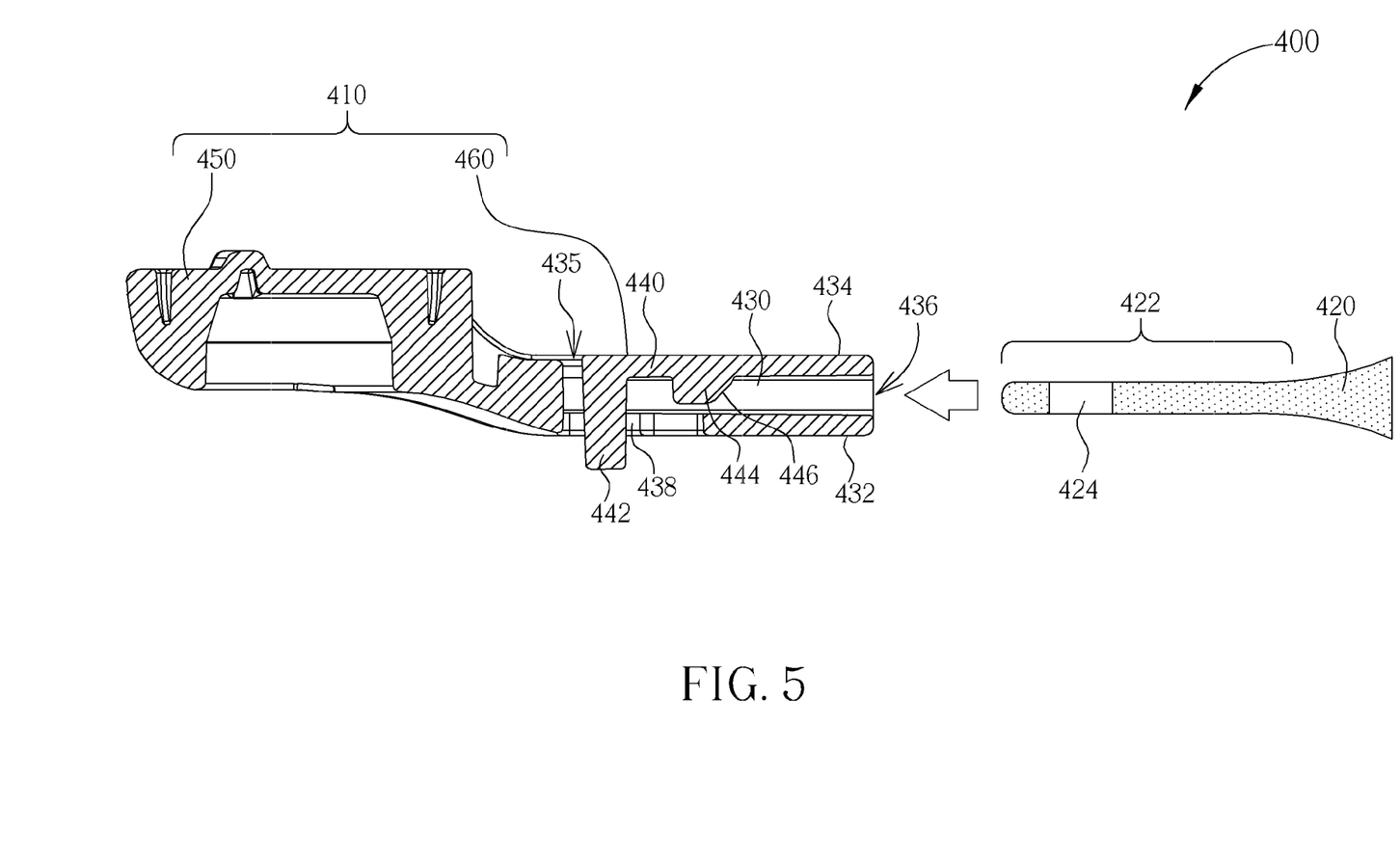
FIG. 5 shows a side-view diagram of the canopy supports and the canopy frame when they are not connected.
Figure 6:
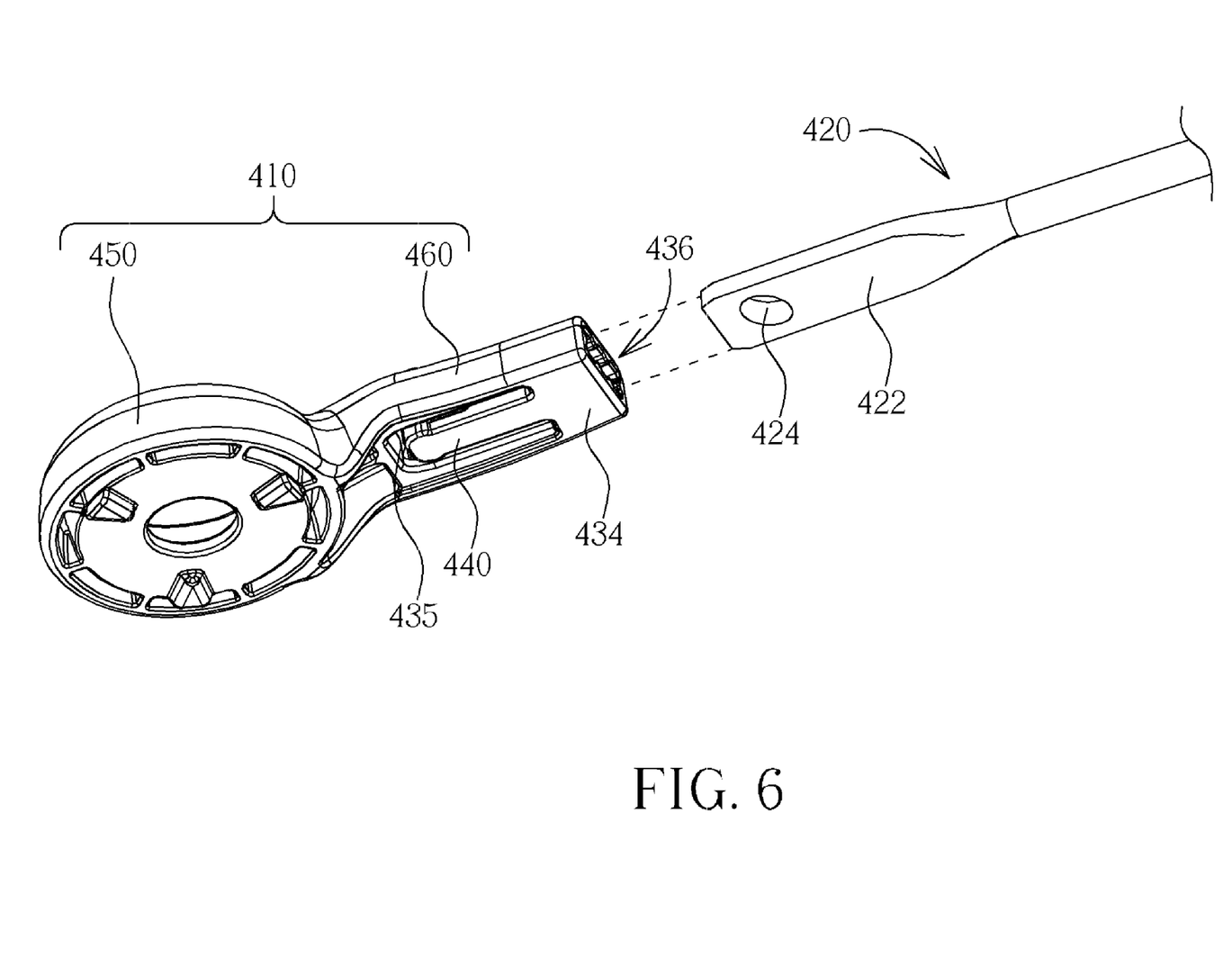
FIG. 6 shows a three-dimensional diagram of the canopy supports and the canopy frame when they are not connected.
Figure 7:
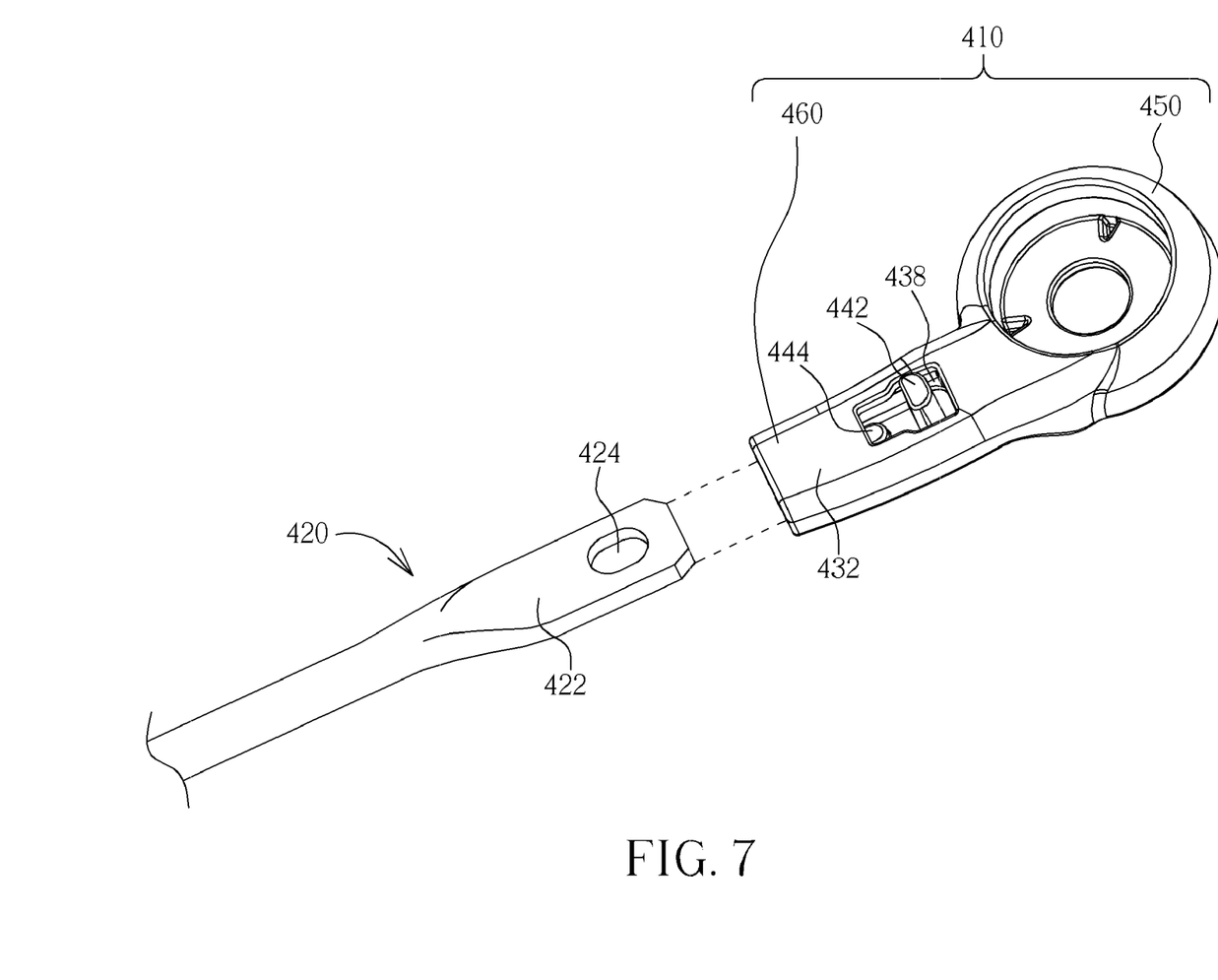
FIG. 7 shows a three-dimensional diagram of the canopy supports and the canopy frame when they are not connected.

Please refer to FIG. 4. FIG. 4 shows a three-dimensional diagram of a canopy mechanism 400 according to an embodiment of the present invention. As shown in FIG. 4, the canopy mechanism 400 comprises a pair of canopy supports 410 and a canopy frame 420. The canopy frame 420 can be a metal wire such as an iron wire, and the canopy support 410 can be made by plastic. Please refer to FIG. 5, FIG. 6, and FIG. 7. FIG. 5 shows a side-view diagram of the canopy supports 410 and the canopy frame 420 when they are not connected. FIG. 6 and FIG. 7 show three-dimensional diagrams of the canopy supports 410 and the canopy frame 420 when they are not connected. As shown in FIG. 5, FIG. 6, and FIG. 7, the canopy support 410 comprises a combining part 450 and an engaging part 460. The engaging part 460 comprises: a first lateral wall 432, a second lateral wall 434 and a cantilever structure 440. A chamber 430 is formed between the first lateral wall 432 and the second lateral wall 434. The first lateral wall 432 has a hole 438, and the second lateral wall 434 has an opening 435. The cantilever structure 440 extends from a side of the opening 435 therein.

Figure 8:
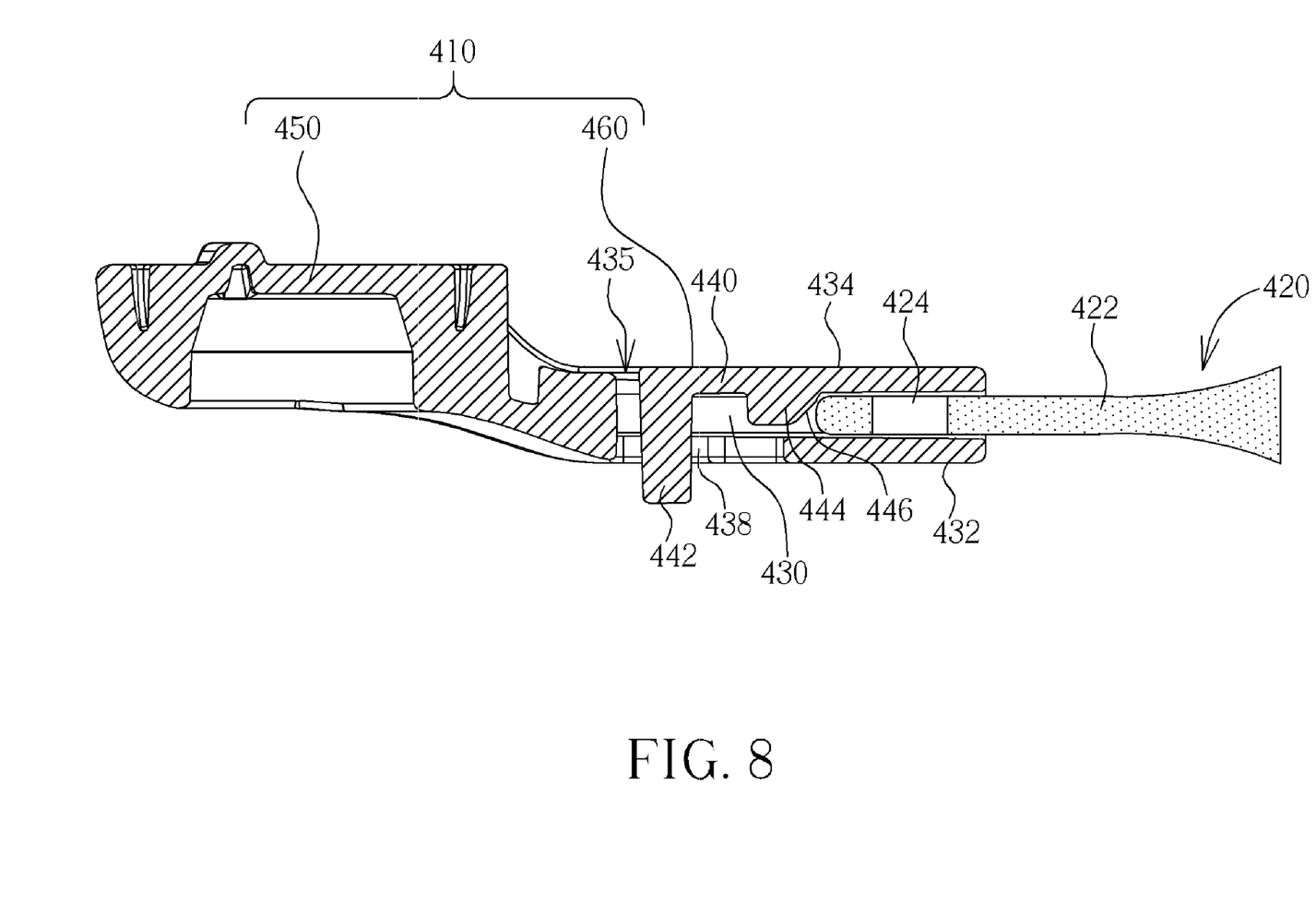
FIG. 8 shows a side-view diagram of the canopy supports and the canopy frame when the canopy frame inserts into the canopy supports but has not been connected to the canopy supports yet.
Figure 9:
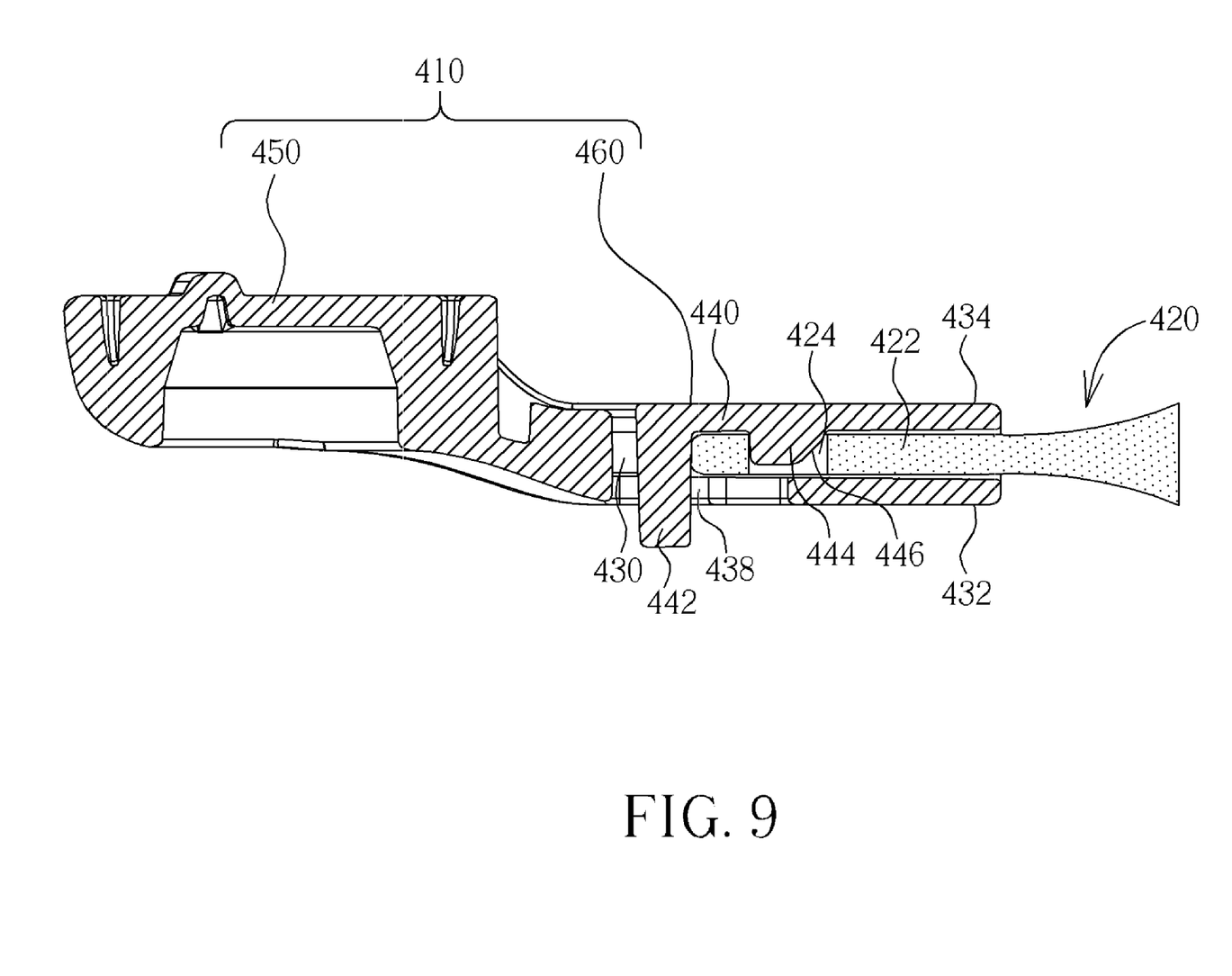
FIG. 9 shows a side-view diagram of the canopy supports and the canopy frame when the canopy frame is connected to the canopy supports.

The chamber 430 has a chamber entrance 436. The cantilever structure 440 is positioned on the second lateral wall 434 of the chamber 430, and the cantilever structure 440 has a first position-limiting part 444. In this embodiment, the first position-limiting part 444 is a protruding lump having an inclined plane 446. The inclined plane 446 is positioned at one side of the first position-limiting part 444 facing the chamber entrance 436. The canopy frame 420 has two connection parts 422, and the connection parts 422 have a second position-limiting part 424, respectively. In this embodiment, the second position-limiting part 424 is a hole corresponding to the first position-limiting part 444. After the two connection parts 422 of the canopy frame 420 respectively insert into the chamber 430 of one of the pair of the canopy supports 410 via the chamber entrance 436 of the chamber 430, the connection part 422 of the canopy frame 420 will contact the inclined plane 446 of the first position-limiting part 444, and the inclined plane 446 will impart the force to push the cantilever structure 440 out of the opening 435 of the second lateral wall 434. As shown in FIG. 8, FIG. 8 shows a side-view diagram of the canopy supports 410 and the canopy frame 420 when the canopy frame 420 inserts into the canopy supports 410 but has not been connected to the canopy supports 410 yet. Next, the first position-limiting part 444 of the chamber 430 will be engaged with the second position-limiting part 424 of the connection part 422 of the canopy frame 420. As shown in FIG. 9, FIG. 9 shows a side-view diagram of the canopy supports 410 and the canopy frame 420 when the canopy frame 420 is connected to the canopy supports 410. However, this is only for an illustrative purpose and is not meant to be a limitation of the present invention. For example, the first position-limiting part of the cantilever structure also can be a hole, and the second position-limiting part of the connection part of the canopy frame can be a corresponding protruding lump, and this condition also falls into the disclosed scope of the present invention.

In addition, in a preferred embodiment, the cantilever structure 440 further has an operation part, and the engaged first position-limiting part 444 and the second position-limiting part 424 can be released by operating the operation part. In this embodiment, the operation part is a protruding part 442, and the protruding part 442 and the first position-limiting part 444 are protruding from an inside surface of the cantilever structure 440, and the protruding part 442 protrudes out of the first lateral wall 432 via the hole 438 of the first lateral wall 432.

After the canopy frame 420 is connected to the canopy supports 410, if the users want to separate the canopy supports 410 and the canopy frame 420, the users can lightly press the protruding part 442, and the first position-limiting part 444 and the second position-limiting part 424 of the canopy frame 420 will be released from the engaged status, and then the users can separate the canopy frame 420 from the canopy supports 410 very easily.

Please note that the above embodiment is only for an illustrative purpose and is not meant to be a limitation of the present invention. For example, the operation part and the first position-limiting part 444 also can be positioned on the outside surface and the inside surface of the cantilever structure 440, respectively. The operation part can be a protruding part such as a pulling bar or a grip, utilized for pulling the cantilever structure 440 from outside of the second lateral wall 434, so as to separate the first position-limiting part 444 and the second position-limiting part 424. Or, a free end of the cantilever structure 440 can be utilized as the operation part, and the free end can be bent to separate the first position-limiting part 444 and the second position-limiting part 424.

Next, please note that a distance between the protruding part 442 of the cantilever structure 440 and the chamber entrance 436 of the chamber 430 is longer than a distance between the first position-limiting part 444 of the cantilever structure 440 and the chamber entrance 436 of the chamber 430. A length of the protruding part 442 protruding from the inside surface of the cantilever structure 440 is longer than a length of the first position-limiting part 444 protruding from the inside surface of the cantilever structure 440. Thus, the canopy mechanism disclosed by the present invention has following advantages: 1. Length of the lever arm of the cantilever structure 440 engaged with the second position-limiting part 424 of the canopy frame 420 is not too long, and this can ensure the engaging strength. 2. The protruding part 442 has a longer lever arm than the lever arm of the first position-limiting part 444 so as to let users can press easily. 3. The protruding part 442 is protruding from the first lateral wall 432 so that the users can press with comfort. In addition, since the canopy frame 420 can be a flexible iron wire, and thus the canopy frame is easy to assemble. The canopy support 410 can be made by plastic, and thus cost of the canopy support is low.

Figure 10:
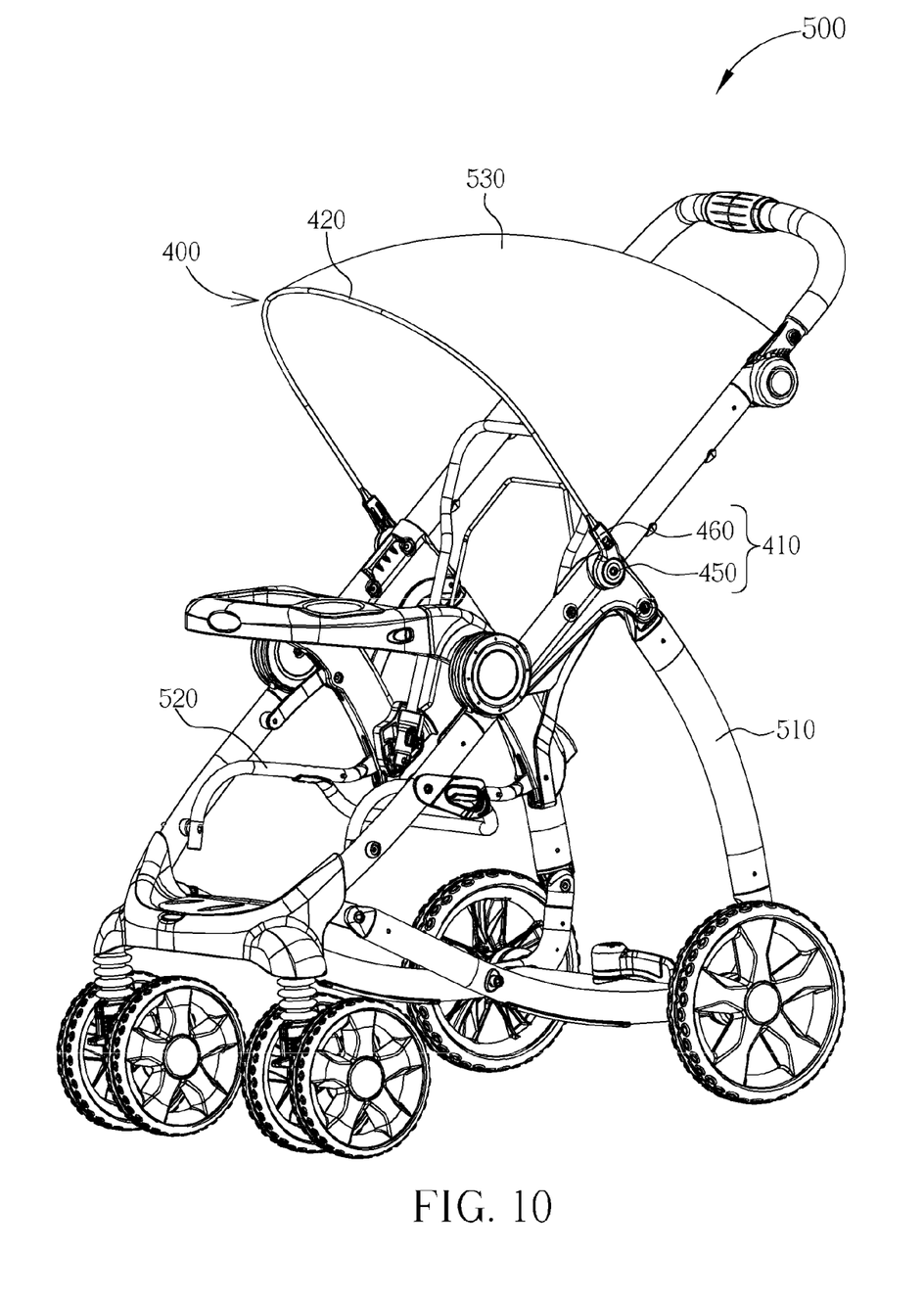
FIG. 10 shows a three-dimensional diagram of the canopy mechanism implemented in a child stroller according to an embodiment of the present invention.

The rotatable combining part 450 can be connected to a child carrier, such as a child stroller, a child cradle, a child swing or a child seat. Please refer to FIG. 10. FIG. 10 shows a three-dimensional diagram of the canopy mechanism 400 implemented in a child stroller 500 according to an embodiment of the present invention. As shown in FIG. 10, the child stroller 500 comprises: a frame assembly 510, a seat 520, a canopy 530, and a canopy mechanism 400, wherein the canopy 530 is disposed on the canopy mechanism 400, the canopy mechanism 400 is disposed on the frame assembly 510, and the seat 520 is disposed on the frame assembly 510. The canopy mechanism 400 comprises a pair of canopy supports 410 and a canopy frame 420. Each canopy support 410 comprises a combining part 450 and an engaging part 460, wherein the combining part 450 is disposed on the frame assembly 510. Preferably, the combining part 450 of the canopy support 410 is rotatably connected to the frame assembly 510. Due to the configuration details related to the canopy mechanism 400 are all well illustrated in the above paragraphs and FIG. 5 to FIG. 9, thus further explanation of the configuration details of the canopy mechanism 400 are omitted herein for the sake of brevity. Please note that the above embodiment is only for an illustrative purpose and is not meant to be a limitation of the present invention.

Briefly summarized, the canopy mechanism 400 disclosed by the present invention has following advantages: 1. length of the lever arm of the cantilever structure 440 engaged with the second position-limiting part 424 of the canopy frame 420 is not too long, and this can ensure the engaging strength. 2. The protruding part 442 has a longer lever arm than that of the first position-limiting part 444 so that the users can press easily. 3. The protruding part 442 is protruding from the first lateral wall 432 so that the users can press with comfort. 4. The canopy frame 420 can be a flexible iron wire, and thus the canopy frame is easy to assemble. 5. The canopy support 410 can be made by plastic, and thus cost of the canopy support is low. 6. The canopy mechanism 400 has fewer elements and the plastic elements are small so that the cost can be reduced.

Those skilled in the art will readily observe that numerous modifications and alterations of the device and method may be made while retaining the teachings of the invention.

What is claimed is:

1. A canopy mechanism, comprising:
    a canopy support, comprising:
        a combining part; and
        an engaging part, a terminal of the engaging part connecting the combining part, and another terminal of the engaging part extending opposite to the combining part, the engaging part comprising:
            a first lateral wall and a second lateral wall, wherein a chamber is formed between the first and second lateral walls, one terminal of the chamber has a chamber entrance, the first lateral wall has a hole, and the second lateral wall has an opening; and
            a cantilever structure, extending from a side of the opening therein, wherein the cantilever structure has a first position-limiting part and a protruding part protruding from an inside surface, and the protruding part protrudes from the first lateral wall via the hole of the first lateral wall; and
    a canopy frame, having a connection part with a second position-limiting part, wherein the connection part of the canopy frame inserts into the chamber via the chamber entrance to engage the first and second position-limiting parts to fasten the canopy frame and the canopy support.

2. The canopy mechanism of claim 1, wherein a distance between the protruding part of the cantilever structure and the chamber entrance is longer than a distance between the first position-limiting part of the cantilever structure and the chamber entrance.

3. The canopy mechanism of claim 1, wherein the first position-limiting part of the cantilever structure is a protruding lump, and the second position-limiting part of the connection part of the canopy frame is a hole.

4. The canopy mechanism of claim 3, wherein a length of the protruding part of the cantilever structure protruding from the inside surface is longer than a length of the protruding lump of the cantilever structure protruding from the inside surface.

5. The canopy mechanism of claim 3, wherein the protruding lump of the cantilever structure has an inclined plane, and when the connection part of the canopy frame inserts into the chamber entrance, the connection part contacts the inclined plane and push the cantilever structure out of the opening of the second lateral wall.

6. The canopy mechanism of claim 1, wherein the first position-limiting part of the cantilever structure is a hole, and the second position-limiting part of the connection part of the canopy frame is a protruding lump.

7. A child carrier, comprising:
    a frame assembly;
    a seat, disposed on the frame assembly;
    a canopy; and
    a canopy mechanism, wherein the canopy is disposed on the canopy mechanism, the canopy mechanism is disposed on the frame assembly, and the canopy mechanism comprises:
        a canopy support, comprising:
            a combining part; and
            an engaging part, a terminal of the engaging part connecting the combining part, and another terminal of the engaging part extending opposite to the combining part, the engaging part comprising:
                a first lateral wall and a second lateral wall, wherein a chamber is formed between the first and second lateral walls, one terminal of the chamber has a chamber entrance, the first lateral wall has a hole, and the second lateral wall has an opening; and
                a cantilever structure, extending from a side of the opening therein, wherein the cantilever structure has a first position-limiting part and a protruding part protruding from an inside surface, and the protruding part protrudes from the first lateral wall via the hole of the first lateral wall; and
        a canopy frame, having a connection part with a second position-limiting part, wherein the connection part of the canopy frame inserts into the chamber via the chamber entrance to engage the first and second position-limiting parts to fasten the canopy frame and the canopy support.

8. The child carrier of claim 7, wherein a distance between the protruding part of the cantilever structure and the chamber entrance is longer than a distance between the first position-limiting part of the cantilever structure and the chamber entrance.

9. The child carrier of claim 7, wherein the first position-limiting part of the cantilever structure is a protruding lump, and the second position-limiting part of the connection part of the canopy frame is a hole.

10. The child carrier of claim 9, wherein a length of the protruding part of the cantilever structure protruding from the inside surface is longer than a length of the protruding lump of the cantilever structure protruding from the inside surface.

11. The child carrier of claim 9, wherein the protruding lump of the cantilever structure has an inclined plane, and when the connection part of the canopy frame inserts into the chamber entrance, the connection part contacts the inclined plane and push the cantilever structure out of the opening of the second lateral wall.

12. The child carrier of claim 7, wherein the first position-limiting part of the cantilever structure is a hole, and the second position-limiting part of the connection part of the canopy frame is a protruding lump.

13. The child carrier of claim 7, wherein the combining part of the canopy support is rotatably connected to the frame assembly.

14. The child carrier of claim 7, wherein the child carrier is one of a child stroller, a child cradle, a child swing and a child seat.

15. A canopy mechanism, comprising:
   a canopy support, comprising:
      a combining part; and
      an engaging part, a terminal of the engaging part connecting the combining part, and another terminal of the engaging part extending opposite to the combining part, the engaging part comprising:
         a first lateral wall and a second lateral wall, wherein a chamber is formed between the first and second lateral walls, one terminal of the chamber has a chamber entrance, and the second lateral wall has an opening; and
         a cantilever structure, extending from a side of the opening therein, wherein the cantilever structure has a first position-limiting part; and
   a canopy frame, having a connection part with a second position-limiting part, wherein the connection part of the canopy frame inserts into the chamber via the chamber entrance to engage the first and second position-limiting parts to fasten the canopy frame and the canopy support.

16. The canopy mechanism of claim 15, wherein the cantilever structure has an operation part, and the engaged first and second position-limiting parts are released by operating the operation part.

17. The canopy mechanism of claim 16, wherein the operation part is a protruding part, the protruding part and the first position-limiting part are protruding from an inside surface of the cantilever structure, the first lateral wall has a hole, and the protruding part protrudes from the first lateral wall via the hole.

18. The canopy mechanism of claim 16, wherein the operation part is disposed on an outside surface of the cantilever structure and the first position-limiting part is disposed on an inside surface of the cantilever structure.

19. The canopy mechanism of claim 16, wherein the operation part is disposed on a free end of the cantilever structure.

* * * * *